Patented May 16, 1944

2,348,781

UNITED STATES PATENT OFFICE 2,348,781

LAMINATING FABRIC

Joseph E. Bludworth, Cumberland, Md., assignor to Celanese Corporation of America, a corporation of Delaware No Drawing. Application October 24, 1940, Serial No. 362,607

10 Claims. (Cl. 8—131)

This invention relates to the preparation of stiffened or laminated fabrics and relates more particularly to the preparation of a laminating fabric for adhesively uniting the separate parts of the laminated fabric.

An object of my invention is the preparation of a laminating fabric containing yarns, filaments or fibers of an organic derivative of cellulose and a plasticizer therefor which are ready for use without prolonged ageing and in which the binding power or adhesion of the laminating fabric is enhanced.

Another object of my invention is to prepare a laminating fabric containing yarns, filaments or fibers of an organic derivative of cellulose and a plasticizer therefor which is dry to the hand and which will be free from greasiness even after exposure to atmospheric conditions for long periods of time.

A further object of my invention is the production of improved laminating fabrics for the production of composite fabrics which are dry and not greasy to the touch and which may be put up in roll or bolt form and stored for an indefinite time without the plasticizer sweating out from the laminating fabric.

Still another object of my invention is the provision of a laminating fabric which, when employed in the production of composite fabrics, yields a product which will not appear wet and discolored due to the sweating of plasticizer through the outer layers of the composite fabric.

Other objects of my invention will appear from the following detailed description.

In processes for preparing fabrics of varying degrees of stiffness for use in wearing apparel or for other technical or commercial uses by effecting the coalescence of two or more layers of fabric by operations involving the use of heat and pressure, one of said layers comprises a laminating fabric containing at least some yarns, filaments or fibers of an organic derivative of cellulose and a plasticizer for the organic derivative of cellulose. These laminating fabrics are prepared by applying to a fabric, made of or containing yarns, filaments or fibers of an organic derivative of cellulose, a suitable plasticizer or plasticizing compound in any suitable manner, as by dipping, spraying or padding the plasticizer or plasticizing compound in solution in a volatile solvent therefor on to the fabric. Emulsions containing the plasticizer may also be employed for applying the plasticizer. When the plasticizer is applied in this manner it is not only taken up by the organic derivative of cellulose yarns but also by the other yarns which may be present in the fabric. The latter yarns have no affinity for the plasticizers employed in accordance with my invention and the plasticizers are therefore superficially and lightly retained therein. This causes the laminating fabric to be greasy to the touch and the outer layers of the composite fabrics made with such laminating fabrics appear wet and discolored due to the plasticizer of the laminating fabric sweating from the said other yarns through the outer layers and to the exposed surfaces of the composite fabric.

Attempts were made to eliminate the excessive greasiness in laminating fabrics without destroying the adhesive properties thereof by removing some of the plasticizer. It was found, however, that when the plasticizer was reduced in quantity, the layers of the resulting composite fabric did not adhere properly as was evidenced by laundering tests and the ease with which the layers of the composite fabric were separated. Other attempts were made to overcome these difficulties by ageing the plasticized laminating fabric so as to cause a migration of the plasticizer from the non-organic derivative of cellulose yarns to the organic derivative of cellulose yarns and a conversion of the organic derivative of cellulose yarns so as to give laminating fabrics which were no longer greasy to the touch. In addition, ageing the plasticized laminating fabric improved its adhesive properties somewhat since the plasticizer was concentrated in the organic derivative of cellulose yarns where is was of the most value. To obtain these beneficial effects, however, it was necessary to age the plasticized laminating fabric for from several days to two weeks with the laminating fabric spread out on racks in open widths. After ageing, it was usual to pad the fabric with a solvent for the plasticizer to remove as much of the plasticizer remaining in the non-thermoplastic yarns as possible and to remove the plasticizer superficially held on the organic derivative of cellulose yarns, and then to age for another period. This required not only an extensive plant area or floor space for the processing but the additional time cycle seriously limited production capacity.

I have now discovered that when plasticized laminating fabrics containing thermoplastic organic derivative of cellulose yarns are aged at elevated temperatures in a highly humid atmosphere, the time necessary to properly age the plasticized laminating fabric is considerably shortened in comparison to ageing in dry heat, but also that the degree of adhesion obtained when these fabrics are used to prepare stiffened composite fabrics is considerably increased. When composite fabrics are made using a laminating fabric prepared by following an ordinary method of ageing in which the plasticized laminating fabric is aged for five days, padded with a solvent and then aged again for about 24 hours, the force necessary to separate the bonded layers varies from 2½ to 2¾ pounds. The same degree of adhesion is obtained using a laminating fabric plasticized and aged for only about 11 hours at high relative humidities. When this fabric is aged for 24 hours, the adhesion rises to 3 and even 3¾ pounds in some cases. Thus, by preparing laminating fabrics according to my invention not only may the capacity of a given plant be increased due to a shortening of the ageing time but the products obtained by using such laminating fabric are more serviceable, more resistant to laundering, and preserve their appearance after long periods of service.

In accordance with my invention the plasticized laminating fabrics are aged in a chamber maintained at temperatures varying from about 30° C. up to about 70° C. Preferably, however, the plasticized laminating fabrics are aged at temperatures of about 40° C. to 55° C. The humidity of the ageing chamber may be maintained at from 30% relative humidity up to saturation, but preferably is maintained at from 70% to about 90% to prevent the deposition or settling of droplets of moisture on the fabric. The humidity of the atmosphere in which the fabric is aged may be controlled by suitable humidifying apparatus well known in the air-conditioning art. However, the humidity may be maintained at desirably high levels in a very simple manner by merely allowing live steam to enter the ageing chamber during the ageing period.

The laminating fabric employed in accordance with my invention is preferably one containing filaments or fibers of cellulose acetate together with filaments or fibers of a non-thermoplastic material. More preferably, the laminating fabric contains about 25 to 35% of cellulose acetate filaments or fibers and 75 to 65% of non-thermoplastic filaments or fibers. While my invention is particularly applicable in connection with laminating fabrics containing cellulose acetate it may be used with other organic derivatives of cellulose such as cellulose propionate, cellulose butyrate, cellulose acetate-propionate, cellulose acetate butyrate and cellulose ethers such as ethyl cellulose and benzyl cellulose. Such non-thermoplastic materials as cotton, regenerated cellulose, linen, natural silk, or wool may be used in the structure of the laminating fabric. While my invention is of particular importance in the production of laminating fabrics containing both organic derivative of cellulose material and non-thermoplastic material, the humidifying and ageing treatment may be applied to laminating fabrics made wholly of organic derivatives of cellulose to effect a conversion of the organic derivative of cellulose or penetration by the plasticizer.

The laminating fabric may be formed by weaving, knitting, knotting or netting the filaments or yarns of the cellulose acetate through or with the yarns or filaments of the non-thermoplastic materials. Generally, the cellulose acetate or other organic derivative of cellulose is so woven, knitted, etc. in relation to the non-thermoplastic material that it forms floats on the surface of the fabric. In this manner the cellulose acetate or organic derivative of cellulose may be destroyed by coalescence in forming the stiffened laminated fabric without weakening the structure of the laminating fabric.

Any suitable plasticizers may be employed in treating the laminating fabric. For example, in the case where the fabric to be treated contains cellulose acetate, ethyl paratoluene sulfonamide, monomethyl xylene sulfonamide, triacetin, dimethyl phthalate, diethyl phthalate, triphenyl phosphate, dimethoxy ethyl phthalate, dibutyl tartrate, or mixtures of two or more of these may be employed. The amount of plasticizer used will generally be from 90% to 140% based on the weight of the cellulose acetate present in the fabric.

To increase the opacity of the final product or to impart special color effects thereto the filaments or fibers of organic derivatives of cellulose may have incorporated therewith finely divided pigments such as titanium dioxide or antimony trioxide or other like pigments. These pigments may be incorporated in the organic derivative of cellulose fibers or filaments by adding the same to the spinning solution from which they are formed.

The process of effecting the lamination of the laminating fabric with one or more layers of fabric may be any suitable method as, for instance, the wet method wherein the assembly of superimposed fabrics are wetted with water or steam and then subjected to heat and pressure; the dry method where the assembly of superimposed fabrics are subjected directly to heat and pressure in the absence of liquids, or the solvent method wherein the superimposed layers of fabric are wetted with a liquid or vapor which is a solvent or swelling agent at elevated temperatures for the organic derivative of cellulose. Although any process of effecting the lamination may be employed we prefer to employ a two step process in which the superimposed articles are first bound together by a dry method of laminating and then the adhesion between the layers is further increased by a wet method of laminating. For instance, the assembly of fabrics found by the dry method of laminating may be treated with water and then again subjected to heat and pressure. This latter method is more fully disclosed in Patent No. 2,126,830, dated August 16, 1938. The laminating fabric of this invention may be employed in any of the assemblies and in any manner described in said patent.

In order further to illustrate my invention but without being limited thereto, the following examples are given:

Example I

A laminating fabric formed by weaving 35% cellulose acetate yarns with 65% cotton yarns is padded with a plasticizing solution containing about 58 parts of dimethoxy ethyl phthalate, about 40 parts of ethyl alcohol and about 4 parts of triacetin. The amount padded on the fabric is so regulated that there is about 40% weight increase of the fabric after passing through hot chambers at 85° C. for ½ to 5 minutes to remove a substantial part of the alcohol. The fabric is then aged in an ageing room at 55° C. for 24 hours in an atmosphere of substantially 100% relative humidity. At the end of the 24 hour period the fabric was laminated between two cotton fabrics and it was found that the forces necessary to pull the laminated fabric apart were 3¼ to 3¾ pounds both on the inside and the outside joint. Laminating fabric aged at the same temperature for 24 hours but at low humidities showed only 1 pound adhesion when used to form a laminated fabric.

*Example II*

A laminating fabric, such as described in Example I, was treated with a dimethoxy ethyl phthalate and triacetin plasticizing solution and approximately 31% of plasticizer applied to the fabric. The plasticized fabric was then aged for 24 hours at 55° C. and at 80% relative humidity. When laminated between two cotton fabrics to form a composite fabric, the force necessary to separate the layers was 2¾ pounds on the inside and 2½ pounds on the outside. When the ageing of this laminating fabric was continued for 48 hours, the fabric padded with alcohol, and aged for an additional 48 hours, scarcely any improvement in adhesion was noted. The force necessary for the separation of composite fabrics prepared with the laminating fabric aged in this manner beyond 24 hours was only slightly higher, being about 2¾ pounds both on the inside and outside bonds.

The laminating fabric may be employed in the formation of composite or laminated fabrics which may be used for any purpose where a slightly stiffened or stiff and/or a more or less impermeable fabric is desired. An important application of such products is in wearing apparel which may be formed in whole or in part of fabrics made of or prepared from said laminated or composite fabrics. Thus, collars or cuffs for shirts may be formed entirely of the laminated or composite fabrics. Alternatively, shirts may be made wherein the attached collars, neckbands, cuffs, fronts or bosoms are made of such materials. Hats or parts of hats may likewise be formed by such material as may be the inner or sweat bands of hats, visors for caps, cuffs or gauntlets for gloves, inner linings of cravats, stiffening material used in the inner portion of garments such as coats to help retain the shape thereof, shoes and parts thereof, the head piece of gas masks, etc. Fabrics formed by employing this invention may be used for any industrial or technical purposes where fabric of increased stiffness and/or impermeability is required.

It is to be understood that the foregoing detained description is given merely by way of illustration and that many variations may be made therein without departing from the spirit of my invention.

Having described my invention, what I desire to secure by Letters Patent is:

1. In a process for preparing a laminating fabric for adhesively uniting the components of a composite fabric, the steps of applying to a fabric containing fibers of non-thermoplastic material in admixture with fibers of an organic derivative of cellulose, a plasticizer for the organic derivative of cellulose, and causing the migration of at least a part of said plasticizer from the non-thermoplastic material to the organic derivative of cellulose material by ageing the fabric at an elevated temperature in an atmosphere having a relative humidity of from 70 to 90%.

2. In a process for preparing a laminating fabric for adhesively uniting the components of a composite fabric, the steps of applying to a fabric containing fibers of non-thermoplastic material in admixture with fibers of an organic derivative of cellulose, a plasticizer for the organic derivative of cellulose, and causing the migration of at least a part of said plasticizer from the non-thermoplastic material to the organic derivative of cellulose material by ageing the fabric at a temperature of at least 30° C. in an atmosphere having a relative humidity of from 70 to 90%.

3. In a process for preparing a laminating fabric for adhesively uniting the components of a composite fabric, the steps of applying to a fabric containing fibers of non-thermoplastic material in admixture with fibers of an organic derivative of cellulose, a plasticizer for the organic derivative of cellulose, and causing the migration of at least a part of said plasticizer from the non-thermoplastic material to the organic derivative of cellulose material by ageing the fabric at a temperature of at least 45° C. in an atmosphere having a relative humidity of from 70 to 90%.

4. In a process for preparing a laminating fabric for adhesively uniting the components of a composite fabric, the steps of applying to a fabric containing fibers of non-thermoplastic material in admixture with fibers of an organic derivative of cellulose, a plasticizer for the organic derivative of cellulose, and causing the migration of at least a part of said plasticizer from the non-thermoplastic material to the organic derivative of cellulose material by ageing the fabric for at least 12 hours at an elevated temperature in an atmosphere having a relative humidity of from 70 to 90%.

5. In a process for preparing a laminating fabric for adhesively uniting the components of a composite fabric, the steps of applying to a fabric containing fibers of non-thermoplastic material in admixture with fibers of an organic derivative of cellulose, a plasticizer for the organic derivative of cellulose, and causing the migration of at least a part of said plasticizer from the non-thermoplastic material to the organic derivative of cellulose material by ageing the fabric for about 24 hours at a temperature of at least 45° C. in an atmosphere having a relative humidity of from 70 to 90%.

6. In a process for preparing a laminating fabric for adhesively uniting the components of a composite fabric, the steps of applying to a fabric containing fibers of non-thermoplastic material in admixtude with fibers of an organic derivative plasticizer for the cellulose acetate, and causing the migration of at least a part of said plasticizer from the non-thermoplastic material to the cellulose acetate material by ageing the fabric at an elevated temperature in an atmosphere having a relative humidity of from 70 to 90%.

7. In a process for preparing a laminating fabric for adhesively uniting the components of a composite fabric, the steps of applying to a fabric containing fibers of non-thermoplastic material in admixture with fibers of cellulose acetate, a plasticizer for the cellulose acetate, and causing the migration of at least a part of said plasticizer from the non-thermoplastic material to the cellulose acetate material by ageing the fabric at a temperature of at least 30° C. in an atmosphere having a relative humidity of from 70 to 90%.

8. In a process for preparing a laminating fabric for adhesively uniting the components of a composite fabric, the steps of applying to a fabric containing fibers of non-thermoplastic material in admixture with fibers of cellulose acetate, a plasticizer for the cellulose acetate, and causing the migration of at least a part of said plasticizer from the non-thermoplastic material to the cellulose acetate material by ageing the fabric at a temperature of at least 45° C. in an atmosphere having a relative humidity of from 70 to 90%.

9. In a process for preparing a laminating fabric for adhesively uniting the components of a composite fabric, the steps of applying to a fabric containing fibers of non-thermoplastic material in admixture with fibers of cellulose acetate, a plasticizer for the cellulose acetate, and causing the migration of at least a part of said plasticizer from the non-thermoplastic material to the cellulose acetate material by ageing the fabric for at least 12 hours at an elevated temperature in an atmosphere having a relative humidity of from 70 to 90%.

10. In a process for preparing a laminating fabric for adhesively uniting the components of a composite fabric, the steps of applying to a fabric containing fibers of non-thermoplastic material in admixture with fibers of cellulose acetate, a plasticizer for the cellulose acetate, and causing the migration of at least a part of said plasticizer from the non-thermoplastic material to the cellulose acetate material by ageing the fabric for about 24 hours at a temperature of at least 45° C. in an atmosphere having a relative humidity of from 70 to 90%.

JOSEPH E. BLUDWORTH.

CERTIFICATE OF CORRECTION.

Patent No. 2,348,781. May 16, 1944.

JOSEPH E. BLUDWORTH.

It is hereby certified that error appears in the printed specification of the above numbered patent requiring correction as follows: Page 3, second column, line 49, for "admixtude" read --admixture--; same line, for the words "an organic derivative" read --cellulose acetate, a--; and that the said Letters Patent should be read with this correction therein that the same may conform to the record of the case in the Patent Office.

Signed and sealed this 1st day of August, A. D. 1944.

(Seal)

Leslie Frazer
Acting Commissioner of Patents.